June 24, 1930.  M. P. BACCOMO  1,766,091

BALE HOIST HOOK

Filed June 19, 1928

INVENTOR.
M. P. BACCOMO
BY Henry N. Young
ATTORNEY

Patented June 24, 1930

1,766,091

UNITED STATES PATENT OFFICE

MICHELE P. BACCOMO, OF GREENFIELD, CALIFORNIA

BALE-HOIST HOOK

Application filed June 19, 1928. Serial No. 286,583.

The invention relates to an improved multiple prong hoist hook particularly designed for moving bales of hay or other fibrous materials from place to place.

An object of the invention is to provide a hook of the class described in which the hook prongs are separately removable from a frame carrying them and in which the mounting means for the prongs is structurally independent of the frame.

Another object of the invention is to provide an improved and simplified bail for pivotally supporting the prong carrying frame.

A further object of the invention is to provide an improved and simplified catch device for releasably holding the frame to the bail for operatively disposing the prongs.

The invention possesses other objects and features of advantage, some of which, with the foregoing, will be set forth in the following description of a preferred form of the invention which is illustrated in the drawings accompanying and forming part of the specification. It is to be understood, however, that I do not limit myself to the showing made by the said drawing and description as I may adopt variations of the preferred form within the scope of my invention as set forth in the claims.

Referring to said drawing.

Figure 1:
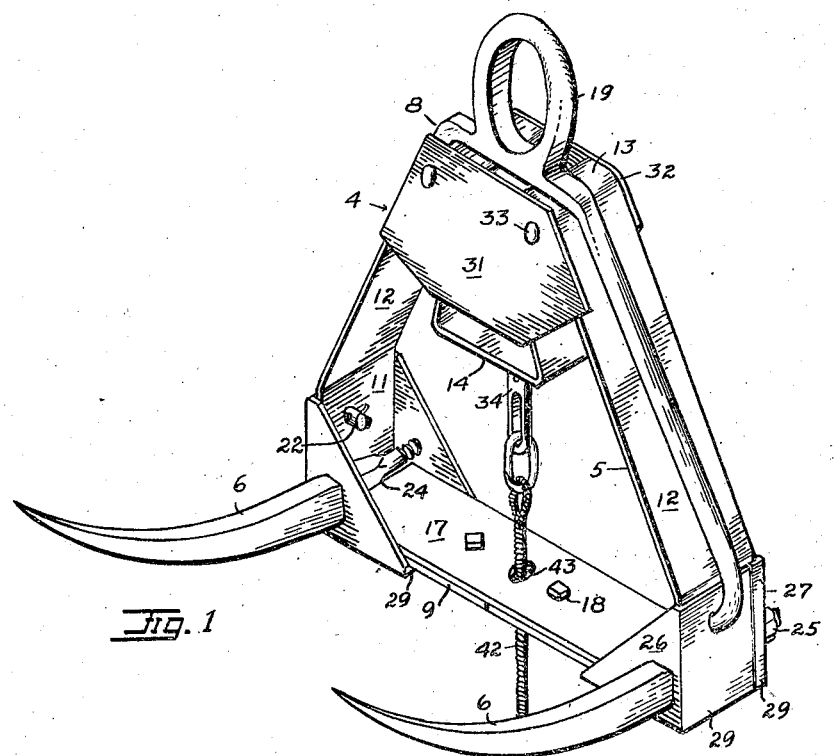
Figure 1 is a front perspective view of a hook embodying the invention.
Figure 2:
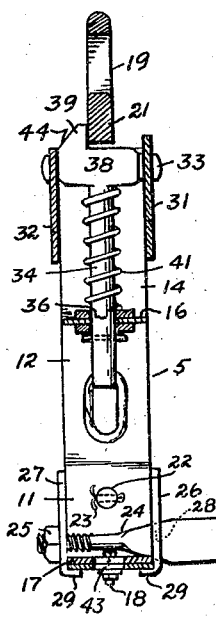
Figure 2 is an edge sectional view of the hook.
Figure 3:
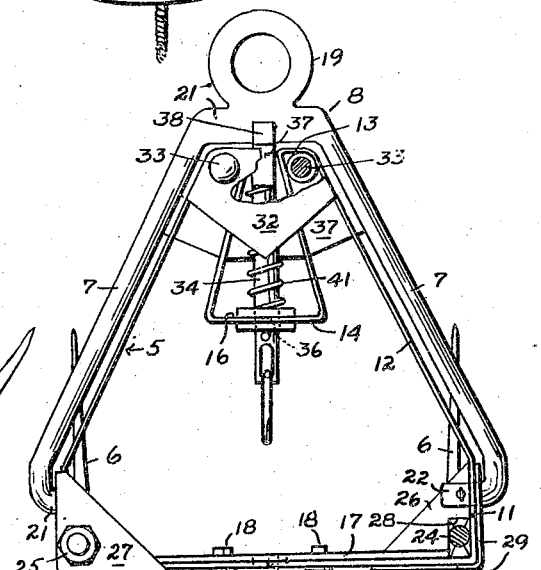
Figure 3 is a rear view of the hook, different portions of the structure being removed.

Essentially and as herewith particularly illustrated, the hook 4 of my invention comprises a frame 5 carrying a pair of prongs 6 extending transversely therefrom and pivotally supported by and between the arms 7 of a bail 8 which in turn is arranged for attachment to a hoisting rope or cable (not shown).

The frame 5 is preferably shaped of a single strip of strap iron to define a closed figure of the general outline of an isosceles trapezoid with the faces of the strip disposed in perpendicular relation to the plane of the figure defined thereby. As shown, the frame comprises a longer base portion 9, side portions 11 of equal length extending perpendicularly from the base portion 9, and side portions 12 of equal length extending obliquely inwardly from the ends of the portions 11 and terminating at the extremities of the other and shorter base portion 13 of the frame which is parallel to the portion 9. An intermediate part 14 of the frame portion 13 is offset inwardly within the frame space to provide a spring seat 16, said seat being parallel to the frame portion 9 and the part 14 being in the general form of a stirrup with an open side opposite the seat 16 and in the plane of the base 13. Preferably, and as shown, the extremities of the frame strip are arranged to abut midway of the portion 9 and are held in fixed relation by means of an overlying plate 17 releasably secured thereto as by bolts 18, the reason for this particular structure being hereinafter brought out.

The bail 8, it will now be noted, preferably comprises a one-piece member of wrought iron and is shaped to have the various parts thereof lie along the sides and portion 9 of the frame 5 in parallel relation thereto, an integral eye 19 being provided at the intermediate bail portion 21 opposite the frame portion 13 for securing a hoist rope (not shown) to the bail. The free ends of the bail are turned inwardly to provide coaxially aligned trunnions 22 for engagement through bearing perforations provided in the frame side portions 11 in spaced relation from the portion 9. If desired, the trunnion portions arranged to lie inwardly of the frame portions 11 may be perforated for the reception of cotter keys or pins 23. It will now be noted that the bail 8 will generally be of such stiffness that springing it into place without deforming it will be difficult, if not impossible, and a preferred method of mounting the frame on the bail is therefore to spring the frame sides inwardly toward each other with the parts of the portion 9 overlapping and then moving the frame sides apart with the bearing perforations registering with the trunnions 21. The plate 17 is then secured in place and a proper assembly is thus arranged to be provided and maintained.

The prongs 6, it will now be noted, are arranged to be mounted with their base portions 24 disposed in the two corners defined by the frame portions 9 and 11, and between the portion 9 and the pivotal axis of the bail 8. The prongs proper are of rectangular section and the base portions 24 thereof are tapered down therefrom to finally terminate in cylindrical portions which are threaded for the reception of nuts 25. Clamp plates 26 and 27 are mounted on each prong base 24, the former being provided with a rectangular opening 28 for the wedged reception of the tapered base portions, while the latter is perforated to freely receive the threaded end of the prong base. The mounting plates 26 and 27 of a prong are arranged to be disposed at opposite sides of the frame and against the edges of the intersecting frame portions 9 and 11. These plates are triangular in shape with the edges designed to lie along the portions 9 and 11 in the same angular relation as are said portions.

Inwardly extending flanges 29 are preferably provided at the before mentioned plate edges and the prong base is arranged to engage both of the frame portions 9 and 11 whereby, when the plates are clamped to the frame by means of the nut 25, the prong is positively secured against shifting in the frame, it being particularly noted that the prong mounting means now described does not involve the perforation of the frame of provision of special prong securing means as part of the frame structure. If desired, the flanges 29 of the plates 26 which lie along the frame portion 11 may extend beyond the trunnion receiving perforations and be perforated thereat whereby they provide additional bearing surface for the trunnions. The plate 17 may be of a length to abut the inner side of the tapered base portion of the prong for further securing the prong against turning. The prongs are of an arcuately curved and tapered form and are mounted in the frame with their planes parallel and their tips disposed somewhat above the level of their bases when the device is suspended with the frame and bail in coplanar relation, as illustrated.

Means are provided for releasably securing the frame and bail in coplanar relation, such being the necessary relation of these parts when the hook is supporting a load. Fixed at the top of the frame and against the edges of the frame portions 12 and 13 are front and rear plates 31 and 32. These plates are preferably fixed in position by means of rivet pins 33 extending between them, each pin engaging between and against the stirrup 14, an opposed side frame portion 12 and the adjacent part of the frame portion 13 whereby the bottom parts may be secured in fixed relation for stiffening the frame thereat. The front plate 31, it is noted, extends beyond the frame portion 13 to act as a stop for engagement with the bail portion 21 to prevent a backward swinging of the frame, while the plate 32 is generally flush with the frame portions at its edges thereat whereby a forward swinging of the frame from within the bail is permitted.

A latch bolt 34 is utilized for releasably securing the frame in the position shown, such bolt being mounted for longitudinally guided movement in a perforation 36 provided in the frame portion 14 and through the opening 34 provided between the separate parts of the frame portion 13, it being noted that the plates 31 and 32 also define sides of the opening 37. The latch bolt 34 is provided with an enlarged head portion 38 engaged in the opening 37 and providing a detent extension 39 arranged for engagement behind the bail portion 21 when the frame and bail are related as shown. A compression spring 41 is operatively engaged about the bolt and between the head 38 thereof and the spring seat 16 of the stirrup 14 whereby the bolt is resiliently urged to maintain its extended position. Release of the bolt is arranged to be effected by retracting the same through the use of a tripper rope 42 secured to the inner end of the bolt and extending therefrom through a perforation 43 extending through the plate 17 and frame portion 9 whereby a pull axially of the bolt may be effected for displacing it to release the frame. The rear portion of the bolt extension 39 is shaped to provide a bevelled face 44 whereby a forcible engagement thereof against the front of the bail portion 21 as the frame is swung to a position within the bail is arranged to spring the bolt back and under the bail portion 21 to effect the disposal of the extension 39 behind said bail portion, the bolt thus operating as a spring catch to releasably hold the bail and frame in coplanar relation.

To use the device in transporting a bale of material from one point to another, the frame and bail are first locked together and the prongs are then forced transversely into a side of the bale. A lifting on the bail will, on account of the angular relation of the prongs to the frame, effect a lifting of the bale, and when the latter is disposed above or at its intended point of delivery, the catch would be tripped by a pull on the rope 36 whereby the prongs may assume a position in general alignment with the plane of the bail and so out of engagement with the bale. It is noted that the present device is particularly designed for use in handling baled materials which are not injured by the insertion of the hook prongs thereinto, such materials including hay, straw, cotton and hemp, for example.

I claim:

1. In a bale hoist hook, a frame for carrying prongs, a bail having the parts thereof coplanar and providing axially aligned trunnions at the extremities thereof, and means providing bearings in said frame for the pivotal reception of said trunnions whereby said frame is arranged to be disposed entirely between said bail extremities.

2. In a bale hoist hook, a prong carrying frame providing axially aligned trunnion bearings at the extreme opposite sides thereof, a bail providing inwardly directed and axially aligned trunnions at the extremities thereof for engagement in said bearings, and means for releasably retaining said frame in coplanar relation with said bail.

3. In a hoist hook, a prong carrying frame, a bail pivotally supporting said frame, and members on said frame disposable at opposite sides of said bail for retaining the frame in coplanar relation with the bail, one of said members being displaceable and the other fixed.

4. In a hoist hook, a prong carrying frame, a bail pivotally supporting said frame, and members on said frame disposable at opposite sides of said bail for retaining the frame in coplanar relation with the bail, one of said members comprising a normally extended spring pressed bolt.

5. In a hoist hook, a bail, a prong carrying frame pivotally carried by said bail and comprising a single strip of band iron defining a closed figure with the planes of the strip portions perpendicular to the plane of the frame, and prongs carried in said frame to extend transversely therefrom.

6. In a hoist hook, a prong carrying frame having a transverse opening therethrough providing an angular corner; a prong for mounting on said frame having a tapered base portion of polygonal section terminating in a threaded cylindrical portion and arranged for disposal in said corner; means for mounting said prong on said frame comprising a perforated plate member wedgedly mounted on said tapered prong portion and a second perforated plate member slidably mounted on said threaded prong portion; said plates being arranged for cooperative clamping engagement with said frame at said corner and a nut engaging said threaded prong portion outwardly of said last plate for effecting said clamping engagement of the plates with the frame; and means on said plates cooperative with said frame for maintaining said prong base portion in said corner during and following the clamping of the plates to the frame.

7. In a hoist hook, a prong carrying frame formed of a single strip of band iron and having a pair of opposed and parallelly related sides, a bail pivotally carrying said frame for movement about an axis parallel to said sides, members on said frame at one of said sides disposable at opposite sides of said bail for retaining the frame in coplanar relation with the bail, one of said members comprising a normally extended spring bolt, an intermediate portion of said last side being offset to provide a guideway for said bolt and a spring seat, and a compression spring encircling said bolt and operatively engaged between said seat and bolt.

8. In a hoist hook, a prong carrying frame having a transverse opening therethrough providing an angular corner, a prong for mounting on said frame and having a base portion of polygonal section for fitted disposal in said corner, clamp elements mounted on said prong and cooperative with said frame at said corner to secure said prong base to the frame in fitted engagement with said corner, and releasable means for securing said clamp elements in operative engagement with said frame.

9. In a hoist hook, a prong carrying frame, a bail pivotally carrying said frame, members on said frame disposable at opposite sides of said bail for cooperatively retaining the frame in fixed relation to the bail, one of said members comprising a normally extended bolt, means on said frame providing a guideway for said bolt, and means yieldingly urging said bolt to maintain its extended position in said guideway.

In testimony whereof I affix my signature.

MICHELE P. BACCOMO.